United States Patent
Rajagopalan et al.

(10) Patent No.: US 12,360,862 B2
(45) Date of Patent: Jul. 15, 2025

(54) SYSTEM AND METHOD FOR OPERATING DISTRIBUTED COMPUTER SYSTEMS

(71) Applicant: Bank of America Corporation, Charlotte, NC (US)

(72) Inventors: Anurajam Rajagopalan, Medavakkam (IN); Sathyanarayana Rajendran, Chennai (IN); Shantonu Ghosh, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 121 days.

(21) Appl. No.: 18/474,341

(22) Filed: Sep. 26, 2023

(65) Prior Publication Data

US 2025/0103446 A1    Mar. 27, 2025

(51) Int. Cl.
*G06F 11/07* (2006.01)
*G06F 11/14* (2006.01)

(52) U.S. Cl.
CPC ...... *G06F 11/1471* (2013.01); *G06F 11/0781* (2013.01)

(58) Field of Classification Search
CPC ............. G06F 11/1471; G06F 11/1402; G06F 11/0781; G06F 11/079; G06F 11/0793; G06F 11/0796
USPC ...................................... 714/15, 16
See application file for complete search history.

(56) References Cited

U.S. PATENT DOCUMENTS

| | | |
|---|---|---|
| 6,978,400 B2 | 12/2005 | Hickson |
| 8,357,045 B2 | 1/2013 | Youm et al. |
| 8,482,993 B2 | 7/2013 | Strasser et al. |
| 8,554,726 B2 | 10/2013 | Frantz et al. |
| 8,689,115 B2 | 4/2014 | Vonog et al. |
| 8,707,107 B1 * | 4/2014 | Panna ............... G06F 11/008 714/25 |
| 8,799,400 B2 | 8/2014 | Watte |
| 9,210,100 B2 | 12/2015 | van der Linden et al. |
| 9,578,081 B2 | 2/2017 | Watte |
| 9,588,637 B2 | 3/2017 | Momchilov et al. |
| 9,804,935 B1 * | 10/2017 | Holenstein .......... G06F 11/1469 |
| 10,211,841 B2 | 2/2019 | Zerbe et al. |
| 10,425,496 B2 | 9/2019 | Bedi et al. |
| 10,599,551 B2 | 3/2020 | Lu et al. |
| 10,764,045 B2 | 9/2020 | Surla et al. |
| 10,855,747 B2 | 12/2020 | Momchilov et al. |

(Continued)

FOREIGN PATENT DOCUMENTS

JP    2013527957 A  *  7/2013

*Primary Examiner* — Chae M Ko

(57) ABSTRACT

A system accesses data of a failed interaction with a target system from a queue and determines whether the failed interaction is a data failure or a system failure. For a data failure, the system determines a category and whether it can be fixed. If it can be fixed, the system updates the data and reprocesses the failed interaction based on the updated data. If it cannot be fixed, the system deletes the data from the queue and notifies the target system the category of the data failure. For a system failure, the system identifies a system trend of the target system and determines whether it can be fixed. If it can be fixed, the system determines a reprocessing schedule and reprocesses the failed interaction accordingly. If it cannot be fixed, the system deletes the data from the queue and notifies the target system of the system trend.

20 Claims, 3 Drawing Sheets

(56) References Cited

U.S. PATENT DOCUMENTS

| | | |
|---|---|---|
| 11,516,007 B2 | 11/2022 | Borrill |
| 2015/0127820 A1* | 5/2015 | Kitajima ............. H04L 41/5058 |
| | | 709/224 |
| 2017/0140145 A1 | 5/2017 | Shah |
| 2017/0185475 A1* | 6/2017 | Dey .................... G06F 11/3055 |
| 2019/0052718 A1 | 2/2019 | Bedi |
| 2021/0144164 A1* | 5/2021 | Mathur .................. H04L 67/10 |
| 2023/0281070 A1* | 9/2023 | Harutyunyan ........ G06F 18/214 |
| | | 714/37 |

* cited by examiner

SYSTEM AND METHOD FOR OPERATING DISTRIBUTED COMPUTER SYSTEMS

TECHNICAL FIELD

The present disclosure relates generally to operating distributed computer systems, and more specifically, to a system and method for operating distributed computer systems.

BACKGROUND

A distributed computer system is a system whose components are located on different networked computers, which communicate and coordinate their actions by passing messages to one another. The components of a distributed computer system interact with one another in order to achieve a common goal. Three significant challenges of distributed systems are: maintaining concurrency of components, overcoming the lack of a global clock, and managing the independent failure of components.

SUMMARY

The system disclosed in the present application provides a technical solution of utilizing augmented analytics and decisive intelligence through generative artificial intelligence (AI) to enable an intelligent asynchronous flip process in the orchestration of distributed computer systems. The disclosed system uses augmented analytics to identify the reason behind failure synchronization points, predict the potential data failure trend, and determine criteria for success to be met on the reprocessing of the failure synchronization points. The augmented analytics can help with cleaning the messages that are driven out of the data failures, which would tend to fail on reprocessing. In addition, the disclosed system utilizes generative AI to communicate with target systems on a periodic basis to determine the availability for reprocessing. The generative AI further provides current analytical trends to a target system, which could help the target system to understand the failure trends with cause to reverify their working stability to reprocess the failed synchronization points, which can avoid repetitive failures causing performance issues.

In one embodiment, the disclosed system includes a memory operable to store historical failure data associated with historical failed interactions between a plurality of source systems and a plurality of target systems and a queue configured to store data associated with a plurality of failed interactions with one or more target systems during operation of distributed computer systems. The disclosed system further includes a processor operably coupled to the memory. The processor is configured to access, from the queue, a first data associated with a first failed interaction with a first target system. The processor is then configured to determine, based on an analysis of the accessed first data and the historical failure data by one or more first machine-learning models, whether the first failed interaction is associated with a data failure or a system failure. In one embodiment, the analysis comprises a comparison between the accessed first data and the historical failure data by the one or more first machine-learning models to generate an output comprising a probability indicating the data failure or the system failure. Based on determining whether the first failed interaction is associated with a data failure or a system failure, the processor is configured to perform the following operations. If the first failed interaction is associated with a data failure, the processor is configured to determine by one or more second machine-learning models a category of the data failure. In one embodiment, the determining comprises analyzing the accessed first data by the one or more second machine-learning models to output a probability of the category of the data failure among a plurality of categories. The processor is further configured to determine by the one or more second machine-learning models, based on the category, whether the data failure can be fixed by updating the first data. In one embodiment, the determining comprises comparing the category of the data failure to a plurality of fixable categories. Based on determining whether the data failure can be fixed, the processor is then configured to perform the following operations. If the data failure can be fixed, the processor is configured to update the first data by the one or more second machine-learning models and reprocess the first failed interaction based on the updated first data. If the data failure cannot be fixed, the processor is configured to delete the first data from the queue and transmit a notification comprising the category of the data failure to the first target system. If the first failed interaction is associated with a system failure, the processor is configured to identify by the one or more second machine-learning models a system trend associated with the first target system by analyzing historical interaction data and success rate for interaction processing associated with the one or more target systems. The processor is further configured to determine, based on the system trend, whether the system failure can be fixed, wherein the determining comprises analyzing the system trend by the one or more second machine-learning models to predict a confidence level for successfully reprocessing the first failed interaction. Based on determining whether the system failure can be fixed, the processor is configured to perform the following operations. If the system failure can be fixed, the processor is configured to determine by the one or more second machine-learning models a reprocessing schedule to reprocess the first failed interaction and reprocess the first failed interaction according to the reprocessing schedule. If the system failure cannot be fixed, the processor is configured to delete the first data from the queue and transmit a notification comprising the system trend to the first target system.

The processor of the disclosed system is further configured to encrypt the data associated with the plurality of failed interactions with the one or more target systems. In one embodiment, the first data associated with the first failed interaction with the first target system is encrypted. In this case, the processor is further configured to decrypt the first data associated with the first failed interaction with the first target system.

The processor of the disclosed system is further configured to transmit, to the one or more target systems, a plurality of queries for status associated with a plurality of interactions. The processor is then configured to receive, from the one or more target systems, a plurality of HTTP response codes associated with the plurality of interactions. The processor is then configured to determine, based on the plurality of HTTP response codes, one or more of the plurality of interactions failed.

The processor of the disclosed system is further configured to determine the first data comprises no sensitive data prior to updating the first data if the data failure can be fixed.

The processor of the disclosed system is further configured to generate the one or more first machine-learning models based on contextual and behavioral signals collected over a period of time from a plurality of applications.

In one embodiment, the system trend comprises an availability of the first target system. Correspondingly, the reprocessing schedule is based on the availability of the first target system. In this case, the processor is further configured to generate, based on the one or more second machine-learning models, an availability query. The processor is then configured to transmit, to the first target system, the availability query. The processor is then configured to receive, from the first target system, the availability of the first target system.

In one embodiment, updating the first data by the one or more second machine-learning models comprises one or more of correcting the first data, supplementing the first data, or replacing the first data.

The disclosed system and methods provide the practical application of effectively and efficiently operating distributed computer systems by utilizing augmented analytics and decisive intelligence through generative artificial intelligence (AI) to enable an intelligent asynchronous flip process in the orchestration of distributed computer systems. Prior systems may attempt to reprocess failure data repetitively without identifying the causes, which may result in a hung state of the distributed computer systems. The disclosed system and methods can address such problem by cleaning the failure data in queue for reprocessing which would tend to fail on reprocessing and checking target system availability before getting the failure data reprocessed so that the distributed computer systems can avoid being caught in a hung state. As described in embodiments of the present disclosure, a server uses augmented analytics to identify the reason behind failure synchronization points, predict the potential data failure trend, and determine criteria for success to be met on the reprocessing of the failure synchronization points. The augmented analytics can help with cleaning the messages that are driven out of the data failures, which would tend to fail on reprocessing. In addition, server utilizes generative AI to communicate with target systems on a periodic basis to determine the availability for reprocessing. The generative AI further provides current analytical trends to a target system, which could help the target system to understand the failure trends with cause to reverify their working stability to reprocess the failed synchronization points, which can avoid repetitive failures causing performance issues.

By utilizing the augmented analytics and decisive intelligence to understand a failure reason, whether such a failure is resolvable, and a probability of success for reprocessing, the disclosed system and methods can reduce the network traffic and CPU utilization of the distributed computer systems. By encrypting data held in the queue for analysis or reprocessing mechanism, the disclosed system and methods can enhance the data and network security by preventing data eavesdropping.

Thus, the disclosed system and methods generally improve the technology associated with a computing infrastructure.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
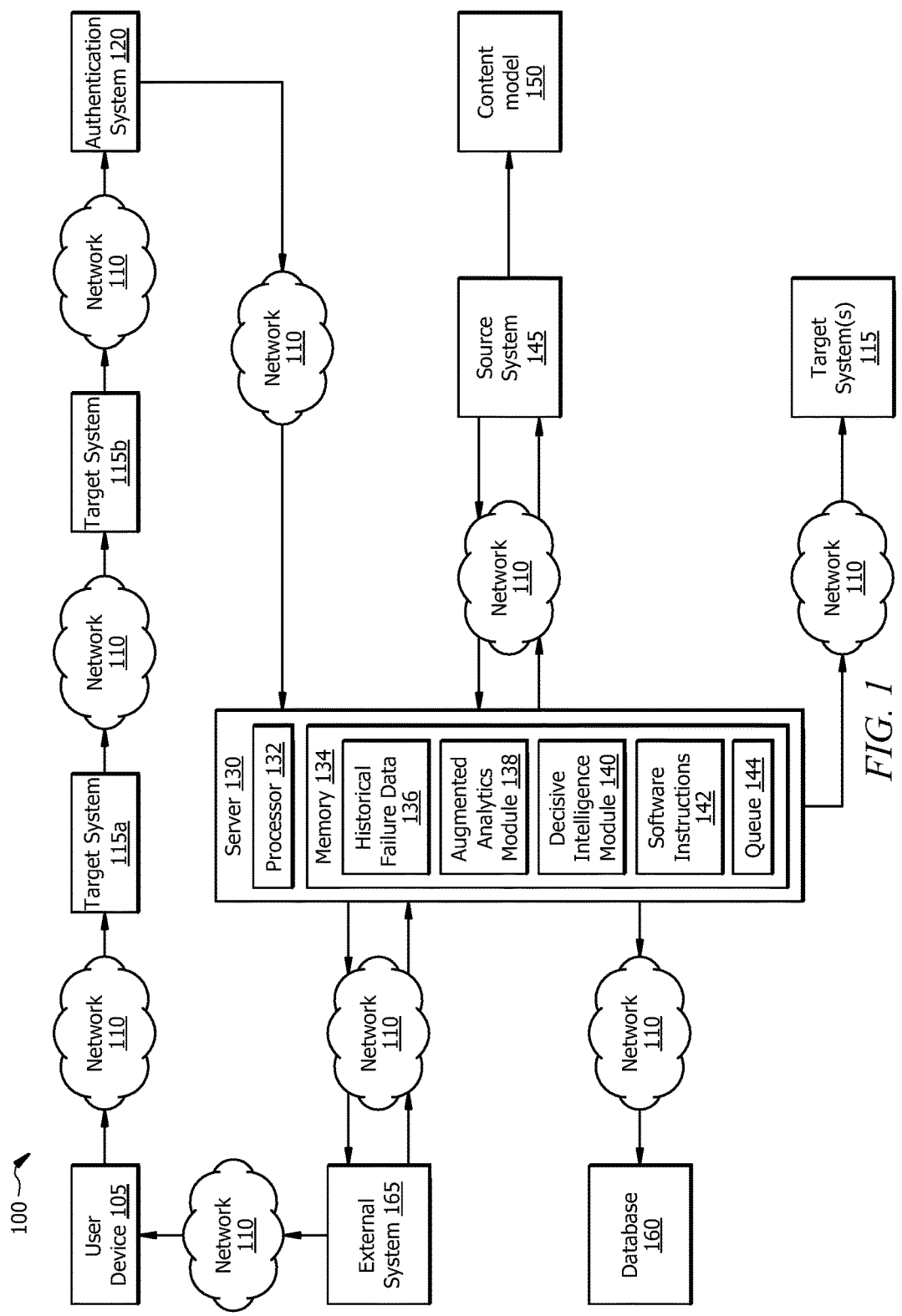
FIG. 1 illustrates an example system for orchestrating distributed system based on augmented analytics and decisive intelligence.
Figure 2A:
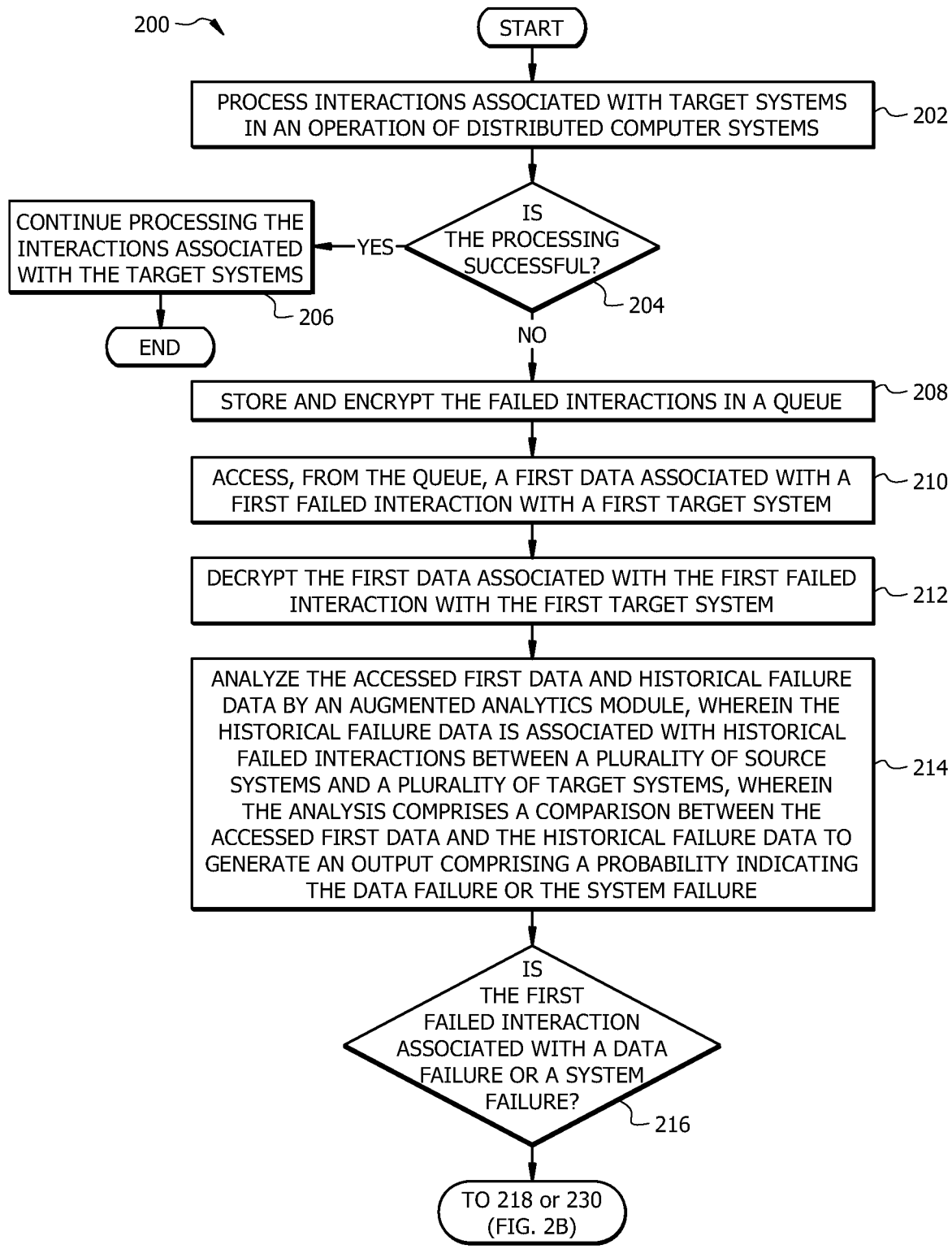
FIGS. 2A-2B illustrate an example flowchart of a method for orchestrating distributed system based on augmented analytics and decisive intelligence.
Figure 2B:
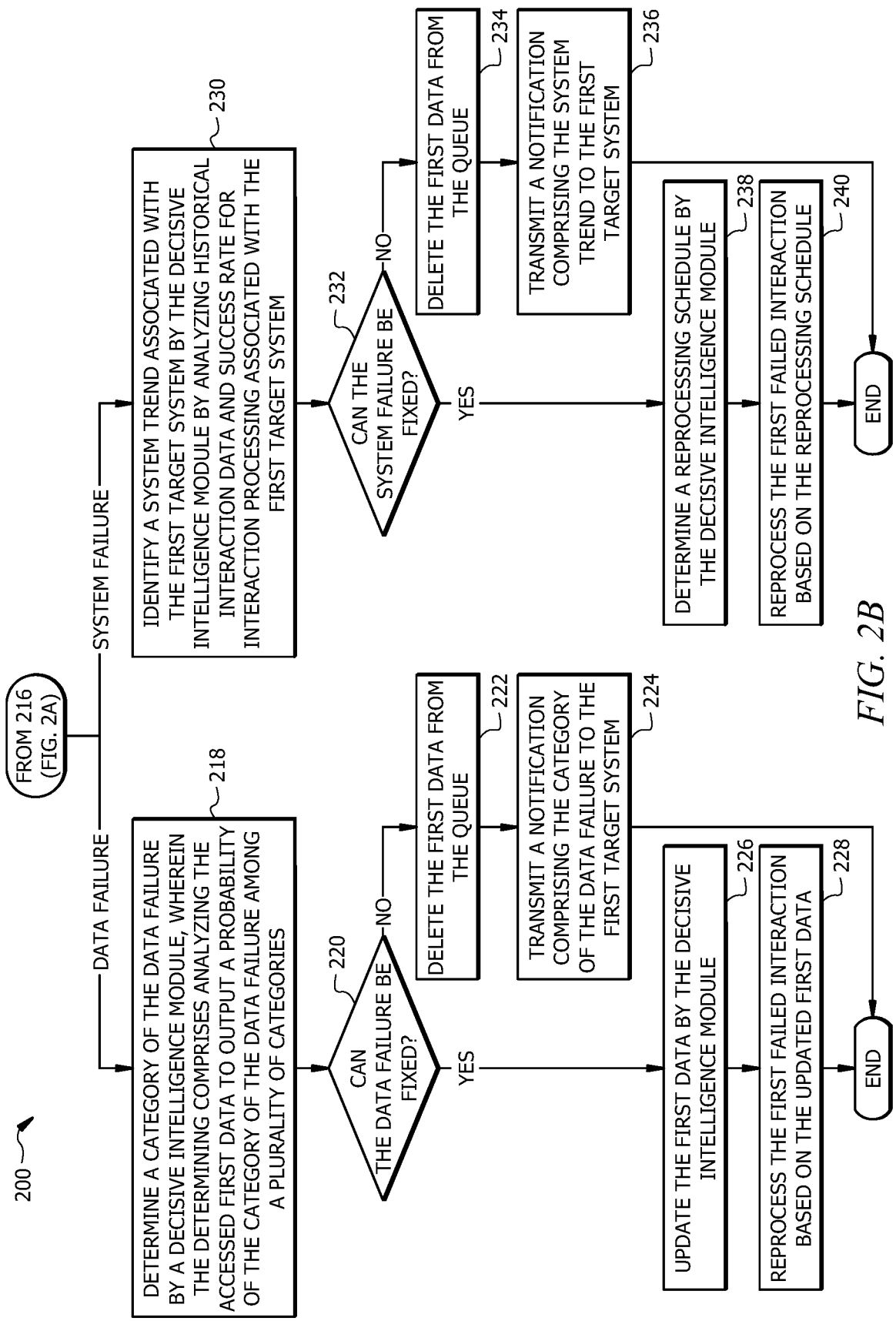

Operating distributed computer systems involves asynchronous orchestrations. During an asynchronous orchestration, multiple synchronous calls may be made from a source system, each of which may reach out to a target system. The targets systems may then perform a particular task and send back the responses to the source system. Once the source system receives the responses, it may aggregate the responses. While conducting the asynchronous orchestration, even if one target system fails, the complete asynchronous orchestration needs to be revoked or started again from the beginning. To prevent the above problem, an asynchronous flip process can be used to capture the current state of the orchestration and store relevant data for reprocessing purposes. This disclosure provides various systems and methods to enable an intelligent asynchronous flip process in the orchestration of distributed computer systems by utilizing augmented analytics and decisive intelligence through generative artificial intelligence (AI). FIG. 1 illustrates a system 100 configured to orchestrate distributed computer systems based on augmented analytics and decisive intelligence through generative artificial intelligence (AI). FIGS. 2A-2B illustrate a method 200 configured to orchestrate distributed computer systems based on augmented analytics and decisive intelligence through generative artificial intelligence (AI).

Example System for Orchestrating Distributed Computer Systems

FIG. 1 illustrates one embodiment of a system 100 that is configured to orchestrate distributed computer systems based on augmented analytics and decisive intelligence through generative artificial intelligence (AI). In one embodiment, a user device 105 can perform an action associated with a process. The process may be associated with multiple interactions with one or more target systems 115. As an example and not by way of limitation, the process may be an electronic signature process and the action may be signing a signature. Examples of user devices 105 include, but are not limited to, computers, laptops, mobile devices (e.g., smart phones or tablets), servers, clients, or any other suitable type of device.

A target system 115a captures the process via a network 110. Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Continuing with the previous example of the electronic signature process, the target system 115a may be a documentation layer which capture the electronic signature process. The target system 115a may be viewed as an upstream system. The target system 115a may store the signature in the captured process against a user profile associated with the signature. The target system 115a may then integrate the user profile with the signature. The integrated information may be provided via the network 110 to target system 115*b*. As an example and not by way of limitation, the target system 115*b* may conduct envelope creation. The target system 115*b* may be viewed as an upstream system. In particular embodiments, an envelope may be a package comprising a document which has user related information, their signature, etc. The envelope is a complete package which gives information of the process or a message indicating why the process has been transferred from target system 115*b*. As an example and not by way of limitation, the envelope may comprise one or more user attributes (e.g., a name, an address, an email address, a telephone number, an identification number, etc.), which may be combined with a document. As another example and not by way of limitation, the envelope may comprise one or more names of people that need to sign a document.

The target system 115*b* then provides the envelope to an authentication system 120 via the network 110. In particular embodiments, the authentication system 120 performs one or more of an authorization of the process, an authentication of the process, or an analysis of logs associated with the process. Once the process satisfies the authentication system 120, it is published by the authentication system 120 to a server 130 via the network 110.

In particular embodiments, a source system 145 may receive the process and relevant data from the server 130 via the network 110 and process the relevant data for the process. Continuing with the aforementioned example of the electronic signature process, the source system 145 may be an enterprise document service layer. The source system 145 may receive a document and combine the document with the previously created envelope. The source system 145 may create an envelope/document combination for signing. The source system 145 may attempt to provide an envelope/document combination to a content model 150. If the source system 145 is not successful in providing the envelope/document combination to the content model 150 (i.e., an interaction is failed), the source system 145 may communicate with the server 130 to invoke an asynchronous flip process on this failed interaction. In particular embodiments, the asynchronous flip process may attempt reprocessing the failed interaction on a failed synchronization point after a stipulated amount of interval.

In particular embodiments, the source system 145 may store statuses of different processes, e.g., whether a process is failed or succeeded regarding different stages of the process. To track such statuses, the server 130 may send them to a database 160 to get stored. Continuing with the example of the electronic signature process, a status may be assigned indicating, e.g., a particular electronic signature completion has been done, an electronic signature trigger has been done, a user profile has been sent, a document has been processed, etc. In particular embodiments, the database 160 may function as an intermediate storage during the integration of handshakes between different target system for an aggregation. Once a process is completed, the stored data in the database 160 may be deleted.

In particular embodiments, system 100 may further comprise an external system 165. In the scenario of the electronic signature process, the external system 165 may store details of the signature related document as well as the signature process. The server 130 may communicate with the external system 165 via the network 110 regarding the stored information as aforementioned. The external system 165 may initiate the process by communicating with the user device 105 via the network 110.

In particular embodiments, the server 130 is generally any device that is configured to process data and communicate with computing devices, databases (e.g., database 160), systems (e.g., authentication system 120, source system 145, target system(s) 115, external system 165), etc., via the network 110. The server 130 is generally configured to perform operations described further below in conjunction with the method 200 described in FIGS. 2A-2B.

The server 130 comprises the processor 132 in signal communication with a network interface associated with network 110 and memory 134. The server 130 may be configured as shown, or in any other configuration.

Processor 132 comprises one or more processors operably coupled to the memory 134. The processor 132 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 132 may be a programmable logic device, a microcontroller, a microprocessor, or any suitable combination of the preceding. The processor 132 is communicatively coupled to and in signal communication with a network interface associated with network 110 and memory 134. The one or more processors 132 are configured to process data. For example, the processor 132 may be 8-bit, 16-bit, 32-bit, 64-bit or of any other suitable architecture. The processor 132 may include an arithmetic logic unit (ALU) for performing arithmetic and logic operations, processor registers that supply operands to the ALU and store the results of ALU operations, and a control unit that fetches software instructions 142 from memory 134 and executes them by directing the coordinated operations of the ALU, registers and other components. The one or more processors 132 are configured to implement various software instructions 142. For example, the one or more processors 132 are configured to execute software instructions 142 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

Memory 134 may be volatile or non-volatile and may comprise a read-only memory (ROM), random-access memory (RAM), ternary content-addressable memory (TCAM), dynamic random-access memory (DRAM), and static random-access memory (SRAM). Memory 134 may be implemented using one or more disks, tape drives, solid-state drives, and/or the like. Memory is operable to store the software and/or any other data or software instructions 142. The software instructions 142 may comprise any suitable set of instructions, logic, rules, or code operable to execute the processor 132. Memory 134 is also operable to store historical failure data 136 associated with historical failed interactions between a plurality of source systems 145 and a plurality of target systems 115.

Memory 134 is additionally operable to store a queue 144 configured to store data associated with a plurality of failed interactions with one or more target systems 115 during operation of distributed computer systems. In case of failures happening during an asynchronous orchestration, the server 130 may store the failures in the queue 144. The server 130 may further conduct encryption and decryption for data in the queue 144. Since data held in the queue 144 may be read by script for analysis or reprocessing mechanism, it may be visible for anyone, thereby leading to data eavesdropping. As such, when writing the process into the queue 144, the server 130 may encrypt that data for security purposes. In particular embodiments, the processor 132 is configured to encrypt the data associated with the plurality of failed interactions with the one or more target systems 115. When analyzing the data for analytic purposes, the server 130 may decrypting it.

Memory is further operable to store an augmented analytics module 138 and a decisive intelligence module 140. As previously disclosed, the asynchronous flip process may attempt reprocessing the failed process after a stipulated amount of interval. The augmented analytics module 138 may help understand the number of failures having been occurring up to date, the reasons causing these failures (e.g., whether a failure is a data failure or a system failure), the success rate out of the failures, etc. In particular embodiments, the augmented analytics module 138 may comprise one or more first machine-learning models. The processor 132 is configured to generate the one or more first machine-learning models based on contextual and behavioral signals collected over a period of time from a plurality of applications.

The decisive intelligence module 140 may help understand the trend of the failures, the possible outcome of using the asynchronous flip process to reprocess the failed process, whether a failure is resolvable, etc. In particular embodiments, the decisive intelligence module 140 may comprise one or more second machine-learning models. The second machine-learning models may be embedded with natural-language processing so that they can also communicate the failure to the target system(s) 115 and inquire the system status from the target system(s) 115. In particular embodiments, the target system(s) 115 may include upstream systems, downstream systems, or both. By utilizing the augmented analytics module 138 and decisive intelligence module 140 to understand if the failure reason can be determined or resolvable, the server 130 can reduce the network traffic and CPU utilization.

Example Method for Orchestrating Distributed Computer Systems

FIGS. 2A-2B illustrate an example flowchart of a method 200 for orchestrating distributed computer systems. Modifications, additions, or omissions may be made to method 200. Method 200 may include more, fewer, or other steps. For example, steps may be performed in parallel or in any suitable order. While at times discussed as the system 100, server 130, processor 132, source system 145, or components of any of thereof performing steps, any suitable system or components of the system may perform one or more steps of the method 200. For example, one or more steps of method 200 may be implemented, at least in part, in the form of software instructions (e.g., software instructions 142 of FIG. 1), stored on non-transitory, tangible, machine-readable media (e.g., memory 134 of FIG. 1) that when run by one or more processors (e.g., processor 132 of FIG. 1) may cause the one or more processors to perform steps 202-240.

Now referring to FIG. 2A, after start, the processor 132 of the server 130 processes interactions associated with target systems 115 in an operation of distributed computer systems at operation 202. At operation 204, the processor 132 determines whether the processing is successful. If the processing is successful, the processor 132 continues processing the interactions associated with the target systems 115 at operation 206. Method 200 then ends.

In particular embodiments, the processor 132 may transmit, to the one or more target systems 115, a plurality of queries for status associated with a plurality of interactions. The processor 132 may then receive, from the one or more target systems 115, a plurality of HTTP response codes associated with the plurality of interactions. The processor 132 may further determine, based on the plurality of HTTP response codes, one or more of the plurality of interactions failed. If the processing is not successful, the processor 132 stores and encrypts the failed interactions in a queue 144 at operation 208.

At operation 210, the processor 132 accesses, from the queue 144, a first data associated with a first failed interaction with a first target system 115.

At operation 212, the processor 132 decrypt the first data associated with the first failed interaction with the first target system 115 when the first data associated with the first failed interaction with the first target system 115 is encrypted.

At operation 214, the processor 132 analyzes the accessed first data and historical failure data 136 by an augmented analytics module 138, wherein the historical failure data 136 is associated with historical failed interactions between a plurality of source systems 145 and a plurality of target systems 115, wherein the analysis comprises a comparison between the accessed first data and the historical failure data 136 to generate an output comprising a probability indicating the data failure or the system failure.

At operation 216, the processor 132 determines whether the first failed interaction is associated with a data failure or a system failure.

Continuing to FIG. 2B, method 200 proceeds to operation 218 if the first failed interaction is associated with a data failure, and proceeds to operation 230 if the first failed interaction is associated with a system failure.

At operation 218, the processor 132 determines a category of the data failure by a decisive intelligence module 140, wherein the determining comprises analyzing the accessed first data to output a probability of the category of the data failure among a plurality of categories. As an example and not by way of limitation, one category of a data failure may be a failure where a user identifier is missing for determining which user a particular document should be attached to in an electronic signature process. As another example and not by way of limitation, another category of a data failure may be missing a piece of necessary information to be embedded in a document for the electronic signature process.

At operation 220, the processor 132 determines whether the data failure can be fixed by updating the first data based on the category. In particular embodiments, the determining may comprise comparing the category of the data failure to a plurality of fixable categories.

If the data failure cannot be fixed, the processor 132 deletes the first data from the queue 144 at operation 222. At operation 224, the processor 132 transmits a notification comprising the category of the data failure to the first target system 115. Method 200 then ends.

If the data failure can be fixed, the processor 132 updates the first data by the decisive intelligence module 140 at operation 226. As an example and not by way of limitation, updating the first data by the one or more second machine-learning models of the decisive intelligence module 140 may comprise one or more of correcting the first data, supplementing the first data, or replacing the first data. In particular embodiments, the processor 132 is further configured to determine the first data comprises no sensitive data prior to updating the first data if the data failure can be fixed.

At operation 228, the processor 132 reprocesses the first failed interaction based on the updated first data. Method 200 then ends.

As disclosed above, method 200 proceeds to operation 230 if the first failed interaction is associated with a system failure. As an example and not by way of limitation, a system failure may be that a target system 115 has been down for a particular period of time. At operation 230, the processor 132 identifies a system trend associated with the first target system 115 by the decisive intelligence module 140 by analyzing historical interaction data and success rate for interaction processing associated with the first target system 115.

At operation 232, the processor 132 determines whether the system failure can be fixed based on the system trend. In particular embodiments, the determining may comprise analyzing the system trend by the one or more second machine-learning models to predict a confidence level for successfully reprocessing the first failed interaction.

If the system failure cannot be fixed, the processor 132 deletes the first data from the queue 144 at operation 234. At operation 236, the processor 132 transmits a notification comprising the system trend to the first target system 115. Method 200 then ends.

If the system failure can be fixed, the processor 132 determines a reprocessing schedule by the decisive intelligence module 140 at operation 238. As an example and not by way of limitation, the system trend may comprise an availability of the first target system 115. In particular embodiments, the processor 132 may generate, based on the one or more second machine-learning models, an availability query. The processor 132 may then transmit, to the first target system 115, the availability query. The processor 132 may further receive, from the first target system 115, the availability of the first target system 115. In this case, the reprocessing schedule may be based on the availability of the first target system 115.

At operation 240, the processor 132 reprocesses the first failed interaction based on the reprocessing schedule. Method 200 then ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system, comprising:
a memory operable to store:
historical failure data associated with historical failed interactions between a plurality of source systems and a plurality of target systems; and
a queue configured to store data associated with a plurality of failed interactions with one or more target systems during operation of distributed computer systems; and
a processor operably coupled to the memory and configured to:
access, from the queue, a first data associated with a first failed interaction with a first target system;
determine, based on an analysis of the accessed first data and the historical failure data by one or more first machine-learning models, whether the first failed interaction is associated with a data failure or a system failure, wherein the analysis comprises a comparison between the accessed first data and the historical failure data by the one or more first machine-learning models to generate an output comprising a probability indicating the data failure or the system failure; and
based on determining whether the first failed interaction is associated with a data failure or a system failure:
if the first failed interaction is associated with a data failure:
determine by one or more second machine-learning models a category of the data failure, wherein the determining comprises analyzing the accessed first data by the one or more second machine-learning models to output a probability of the category of the data failure among a plurality of categories;
determine by the one or more second machine-learning models, based on the category, whether the data failure can be fixed by updating the first data, wherein the determining comprises comparing the category of the data failure to a plurality of fixable categories; and
based on determining whether the data failure can be fixed:
if the data failure can be fixed:
update the first data by the one or more second machine-learning models; and
reprocess the first failed interaction based on the updated first data;
if the data failure cannot be fixed:
delete the first data from the queue; and
transmit a notification comprising the category of the data failure to the first target system; and
if the first failed interaction is associated with a system failure:
identify by the one or more second machine-learning models a system trend associated with the first target system by analyzing historical interaction data and success rate for interaction processing associated with the first target system;
determine, based on the system trend, whether the system failure can be fixed, wherein the determining comprises analyzing the system trend by the one or more second machine-learning models to predict a confidence level for successfully reprocessing the first failed interaction; and
based on determining whether the system failure can be fixed:

if the system failure can be fixed:
  determine by the one or more second machine-learning models a reprocessing schedule to reprocess the first failed interaction; and
  reprocess the first failed interaction according to the reprocessing schedule; and
if the system failure cannot be fixed:
  delete the first data from the queue; and
  transmit a notification comprising the system trend to the first target system.

2. The system of claim 1, wherein the processor is further configured to encrypt the data associated with the plurality of failed interactions with the one or more target systems.

3. The system of claim 1, wherein the first data associated with the first failed interaction with the first target system is encrypted, and wherein the processor is further configured to decrypt the first data associated with the first failed interaction with the first target system.

4. The system of claim 1, wherein the system trend comprises an availability of the first target system, and wherein the reprocessing schedule is based on the availability of the first target system.

5. The system of claim 4, wherein the processor is further configured to:
  generate, based on the one or more second machine-learning models, an availability query;
  transmit, to the first target system, the availability query; and
  receive, from the first target system, the availability of the first target system.

6. The system of claim 1, wherein the processor is further configured to generate the one or more first machine-learning models based on contextual and behavioral signals collected over a period of time from a plurality of applications.

7. The system of claim 1, wherein updating the first data by the one or more second machine-learning models comprises one or more of correcting the first data, supplementing the first data, or replacing the first data.

8. The system of claim 1, wherein the processor is further configured to determine the first data comprises no sensitive data prior to updating the first data if the data failure can be fixed.

9. The system of claim 1, wherein the processor is further configured to:
  transmit, to the one or more target systems, a plurality of queries for status associated with a plurality of interactions;
  receive, from the one or more target systems, a plurality of HTTP response codes associated with the plurality of interactions; and
  determine, based on the plurality of HTTP response codes, one or more of the plurality of interactions failed.

10. A method comprising, by one or more computing systems:
  accessing, from a queue, a first data associated with a first failed interaction with a first target system, wherein the queue is configured to store data associated with a plurality of failed interactions with one or more target systems during operation of distributed computer systems;
  determining, based on an analysis of the accessed first data and historical failure data by one or more first machine-learning models, whether the first failed interaction is associated with a data failure or a system failure, wherein the analysis comprises a comparison between the accessed first data and the historical failure data by the one or more first machine-learning models to generate an output comprising a probability indicating the data failure or the system failure, and wherein the historical failure data is associated with historical failed interactions between a plurality of source systems and a plurality of target systems; and
  based on determining whether the first failed interaction is associated with a data failure or a system failure:
    if the first failed interaction is associated with a data failure:
      determining by one or more second machine-learning models a category of the data failure, wherein the determining comprises analyzing the accessed first data by the one or more second machine-learning models to output a probability of the category of the data failure among a plurality of categories;
      determining by the one or more second machine-learning models, based on the category, whether the data failure can be fixed by updating the first data, wherein the determining comprises comparing the category of the data failure to a plurality of fixable categories; and
      based on determining whether the data failure can be fixed:
        if the data failure can be fixed:
          updating the first data by the one or more second machine-learning models; and
          reprocessing the first failed interaction based on the updated first data;
        if the data failure cannot be fixed:
          deleting the first data from the queue; and
          transmitting a notification comprising the category of the data failure to the first target system; and
    if the first failed interaction is associated with a system failure:
      identifying by the one or more second machine-learning models a system trend associated with the first target system by analyzing historical interaction data and success rate for interaction processing associated with the first target system;
      determining, based on the system trend, whether the system failure can be fixed, wherein the determining comprises analyzing the system trend by the one or more second machine-learning models to predict a confidence level for successfully reprocessing the first failed interaction; and
      based on determining whether the system failure can be fixed:
        if the system failure can be fixed:
          determining by the one or more second machine-learning models a reprocessing schedule to reprocess the first failed interaction; and
          reprocessing the first failed interaction according to the reprocessing schedule; and
        if the system failure cannot be fixed:
          deleting the first data from the queue; and
          transmitting a notification comprising the system trend to the first target system.

11. The method of claim 10, further comprising:
encrypting the data associated with the plurality of failed interactions with the one or more target systems.

12. The method of claim 10, wherein the first data associated with the first failed interaction with the first target system is encrypted, and wherein the method further comprises:
  decrypting the first data associated with the first failed interaction with the first target system.

13. The method of claim 10, wherein the system trend comprises an availability of the first target system, and wherein the reprocessing schedule is based on the availability of the first target system.

14. The method of claim 10, further comprising:
  generating, based on the one or more second machine-learning models, an availability query;
  transmitting, to the first target system, the availability query; and
  receiving, from the first target system, the availability of the first target system.

15. The method of claim 10, further comprising:
  generate the one or more first machine-learning models based on contextual and behavioral signals collected over a period of time from a plurality of applications.

16. A non-transitory computer-readable medium storing instructions that when executed by a processor cause the processor to:
  access, from a queue, a first data associated with a first failed interaction with a first target system, wherein the queue is configured to store data associated with a plurality of failed interactions with one or more target systems during operation of distributed computer systems;
  determine, based on an analysis of the accessed first data and historical failure data by one or more first machine-learning models, whether the first failed interaction is associated with a data failure or a system failure, wherein the analysis comprises a comparison between the accessed first data and the historical failure data by the one or more first machine-learning models to generate an output comprising a probability indicating the data failure or the system failure, and wherein the historical failure data is associated with historical failed interactions between a plurality of source systems and a plurality of target systems; and
  based on determining whether the first failed interaction is associated with a data failure or a system failure:
    if the first failed interaction is associated with a data failure:
      determine by one or more second machine-learning models a category of the data failure, wherein the determining comprises analyzing the accessed first data by the one or more second machine-learning models to output a probability of the category of the data failure among a plurality of categories;
      determine by the one or more second machine-learning models, based on the category, whether the data failure can be fixed by updating the first data, wherein the determining comprises comparing the category of the data failure to a plurality of fixable categories; and
      based on determining whether the data failure can be fixed:
        if the data failure can be fixed:
          update the first data by the one or more second machine-learning models; and
          reprocess the first failed interaction based on the updated first data; and
        if the data failure cannot be fixed:
          delete the first data from the queue; and
          transmit a notification comprising the category of the data failure to the first target system; and
    if the first failed interaction is associated with a system failure:
      identify by the one or more second machine-learning models a system trend associated with the first target system by analyzing historical interaction data and success rate for interaction processing associated with the first target system;
      determine, based on the system trend, whether the system failure can be fixed, wherein the determining comprises analyzing the system trend by the one or more second machine-learning models to predict a confidence level for successfully reprocessing the first failed interaction; and
      based on determining whether the system failure can be fixed:
        if the system failure can be fixed:
          determine by the one or more second machine-learning models a reprocessing schedule to reprocess the first failed interaction; and
          reprocess the first failed interaction according to the reprocessing schedule; and
        if the system failure cannot be fixed:
          delete the first data from the queue; and
          transmit a notification comprising the system trend to the first target system.

17. The non-transitory computer-readable medium of claim 16, wherein the instructions further cause the processor to encrypt the data associated with the plurality of failed interactions with the one or more target systems.

18. The non-transitory computer-readable medium of claim 16, wherein the first data associated with the first failed interaction with the first target system is encrypted, wherein the instructions further cause the processor to decrypt the first data associated with the first failed interaction with the first target system.

19. The non-transitory computer-readable medium of claim 16, wherein the system trend comprises an availability of the first target system, and wherein the reprocessing schedule is based on the availability of the first target system.

20. The non-transitory computer-readable medium of claim 19, wherein the instructions further cause the processor to:
  generate, based on the one or more second machine-learning models, an availability query;
  transmit, to the first target system, the availability query; and
  receive, from the first target system, the availability of the first target system.

* * * * *